(12) United States Patent
Chang et al.

(10) Patent No.: US 10,042,220 B2
(45) Date of Patent: Aug. 7, 2018

(54) LIQUID-CRYSTAL DISPLAY DEVICE

(71) Applicant: InnoLux Corporation, Miao-Li County (TW)

(72) Inventors: Lun-Hao Chang, Miao-Li County (TW); Cheng-Min Wu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/492,476

(22) Filed: Apr. 20, 2017

(65) Prior Publication Data

US 2017/0322464 A1    Nov. 9, 2017

(30) Foreign Application Priority Data

May 4, 2016 (CN) .......................... 2016 1 0289327

(51) Int. Cl.
*G02F 1/1343* (2006.01)
*G02F 1/1333* (2006.01)
*G02F 1/1368* (2006.01)
*G02F 1/1362* (2006.01)

(52) U.S. Cl.
CPC ...... *G02F 1/134309* (2013.01); *G02F 1/1368* (2013.01); *G02F 1/133345* (2013.01); *G02F 1/136286* (2013.01); *G02F 2201/121* (2013.01); *G02F 2201/123* (2013.01)

(58) Field of Classification Search
CPC ............. G02F 1/134309; G02F 1/1368; G02F 1/136286; G02F 1/133345
See application file for complete search history.

(56) References Cited

U.S. PATENT DOCUMENTS

| 8,896,795 B2 * | 11/2014 | Funakoshi ........ G02F 1/134363 349/143 |
| 2017/0255034 A1 * | 9/2017 | Matsushima ..... G02F 1/133707 |
| 2017/0322441 A1 * | 11/2017 | Matsushima ........... G06F 3/044 |

* cited by examiner

*Primary Examiner* — Dung Nguyen
(74) *Attorney, Agent, or Firm* — McClure, Qualey & Rodack, LLP

(57) ABSTRACT

A display device includes an array substrate having a first data line along a first direction. The array substrate further includes a first insulating layer and a common electrode. The insulating layer disposes on the first data line. The common electrode disposes on the insulating layer and includes a plurality of sub-common electrode rows disposed along the second direction which is different from the first direction. The sub-common electrode rows extend along the second direction. The sub-common electrode rows include a first portion, a second portion separated from the first portion, and a connection portion connecting the first and second portions. The first data line overlapping the sub-common electrode rows, and the number of first portions overlapping the first data line is greater than the number of connection portions overlapping the first data.

16 Claims, 5 Drawing Sheets

LIQUID-CRYSTAL DISPLAY DEVICE

CROSS REFERENCE TO RELATED APPLICATIONS

This application claims priority of China Patent Application No. 201610289327.4, filed on May 4, 2016, the entirety of which is incorporated by reference herein.

BACKGROUND OF THE INVENTION

Field of the Invention

The present disclosure relates to display devices, and in particular to display devices having less overlap between common electrodes and data lines.

Description of the Related Art

Due to fulfill the requirements of high-speed image processing and high-quality image displays, flat-panel displays, such displays device have become popular.

Thin film transistors (TFTs) are typically formed on the lower substrate as switching devices. Each TFT has a gate electrode connected to a scanning line, a source electrode connected with a data line, and a drain electrode connected to a pixel electrode.

However, as the trend towards better image resolution and larger display devices continues, the length of conductive lines such as data lines and scanning lines used in display devices increases. As the length of conductive lines increases, parasitic capacitance related to the conductive lines such as data lines and scanning lines used in display devices also increases. As a result, undesired resistance-capacitance (RC) time delays will affect the proper operation of the display devices. Therefore, images and relative electrical properties of the display devices are affected.

BRIEF SUMMARY OF THE INVENTION

An exemplary display device comprises an array substrate. The array substrate comprises a substrate and a first data line disposed on the substrate and extending along a first direction. The array substrate further comprises a first insulating layer disposed on the substrate, covering the first data line, and a common electrode disposed on the first insulating layer. The common electrode comprises a plurality of sub-common electrode rows. The sub-common electrode rows extend along the second direction which is different from the first direction. The sub-common electrode rows comprise a first portion extending along the second direction, a second portion extending along the second direction, and at least one connection portion connecting the first portion and the second portion. The second potion is separated from the first portion. The first data line overlaps the sub-common electrode rows. The number of first portions overlapping the first data line is greater than the number of connection portions overlapping the first data line.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

Figure 1:
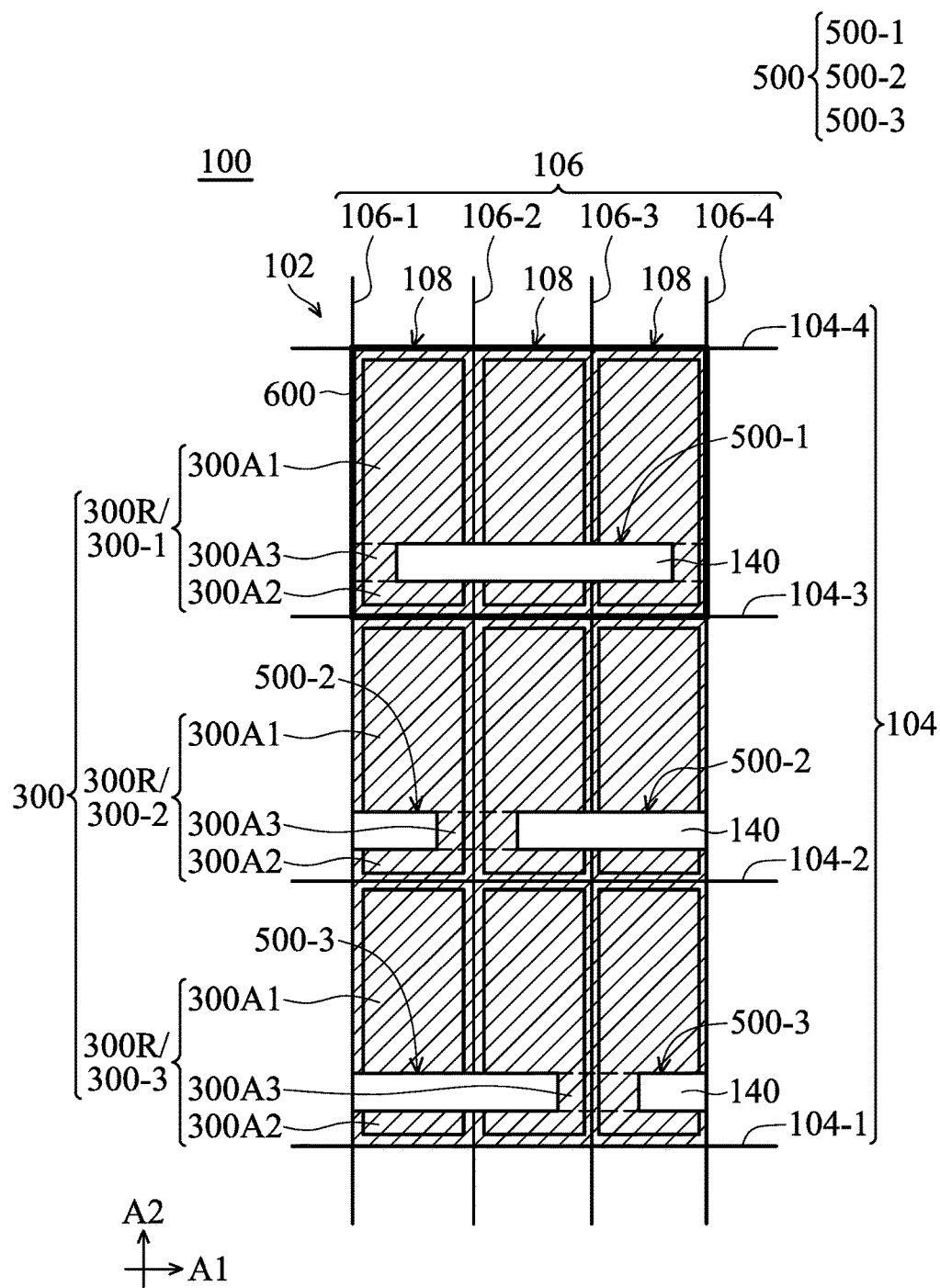
FIG. 1 is schematic top view showing a display device according to an embodiment of the disclosure.

The following description is of the best-contemplated mode of carrying out the disclosure. This description is made for the purpose of illustrating the general principles of the invention and should not be taken in a limiting sense. The scope of the disclosure is best determined by reference to the appended claims.

This description of the exemplary embodiments is intended to be read in connection with the accompanying drawings, which are to be considered part of the entire written description. The drawings are not drawn to scale. In addition, structures and devices are shown schematically in order to simplify the drawing.

In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The term "substrate" refers to the substrate itself, or to a composite object that includes various elements, various electrical wires and various films formed on a substrate. However, the substrate is represented by a flat surface in order to simplify the drawing. The term "substrate surface" is meant to include the uppermost exposed layers on the substrate, such as a glass surface, an organic polymer surface, and insulating layers and/or metal lines. The substrate may comprise glass, organic polymer, inorganic material, silicon, metal, or any other suitable materials.

In some embodiment of the present disclosure, the parasitic capacitance derived from overlaps between the data lines and the common electrode can be decreased by reducing overlap between the common electrode and the data lines, thereby reducing resistance-capacitance (RC) time delays in the display devices. Moreover, in some embodiments of the present disclosure, overlaps between various data lines and the common electrode can be the same or similar, such that various data lines and the common electrode show the same or similar electrical properties, thereby improving image performance of the sub-pixels controlled by the data lines.

Figure 2:
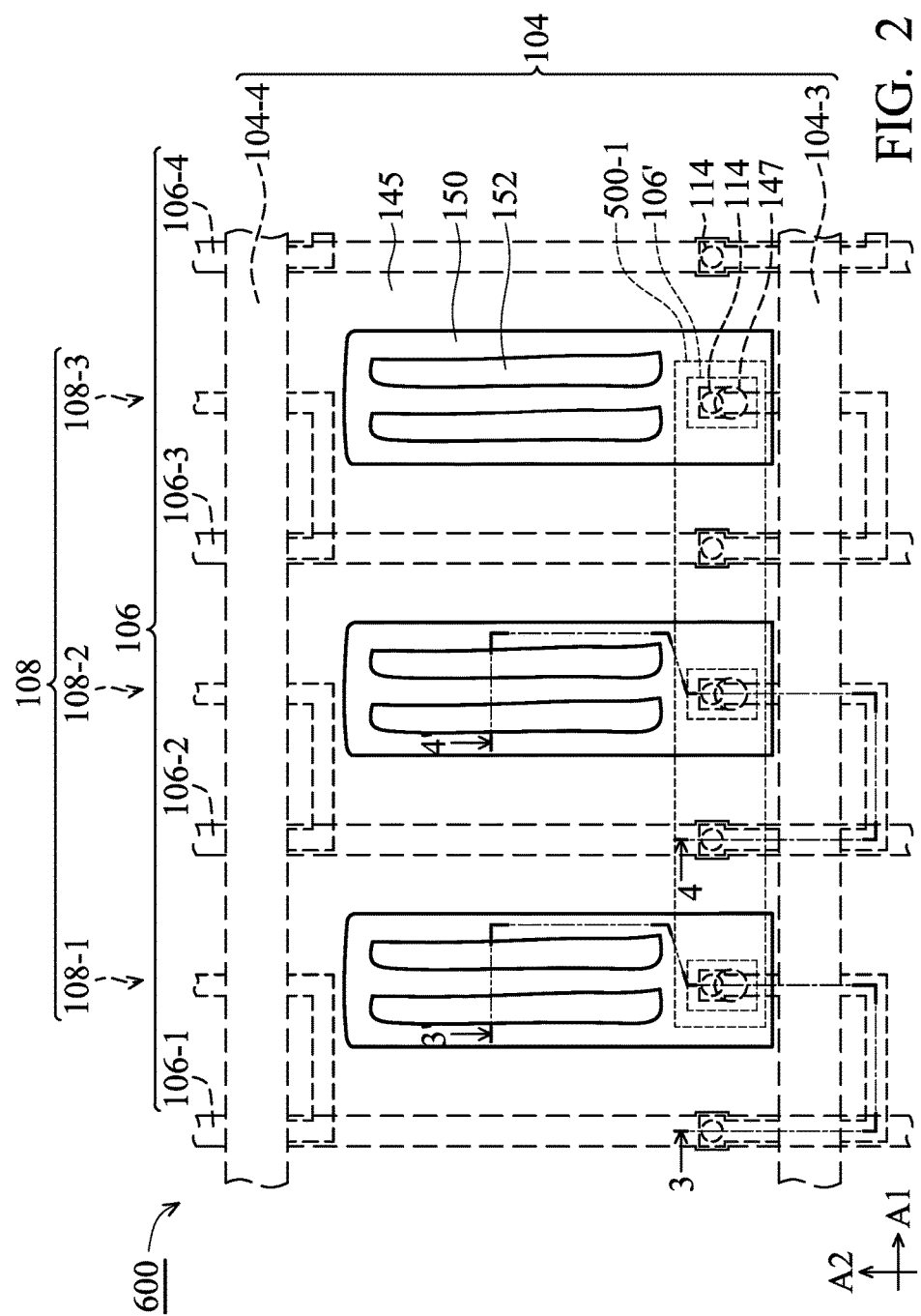
FIG. 2 is a schematic top view showing a pixel in FIG. 1.
Figure 3:
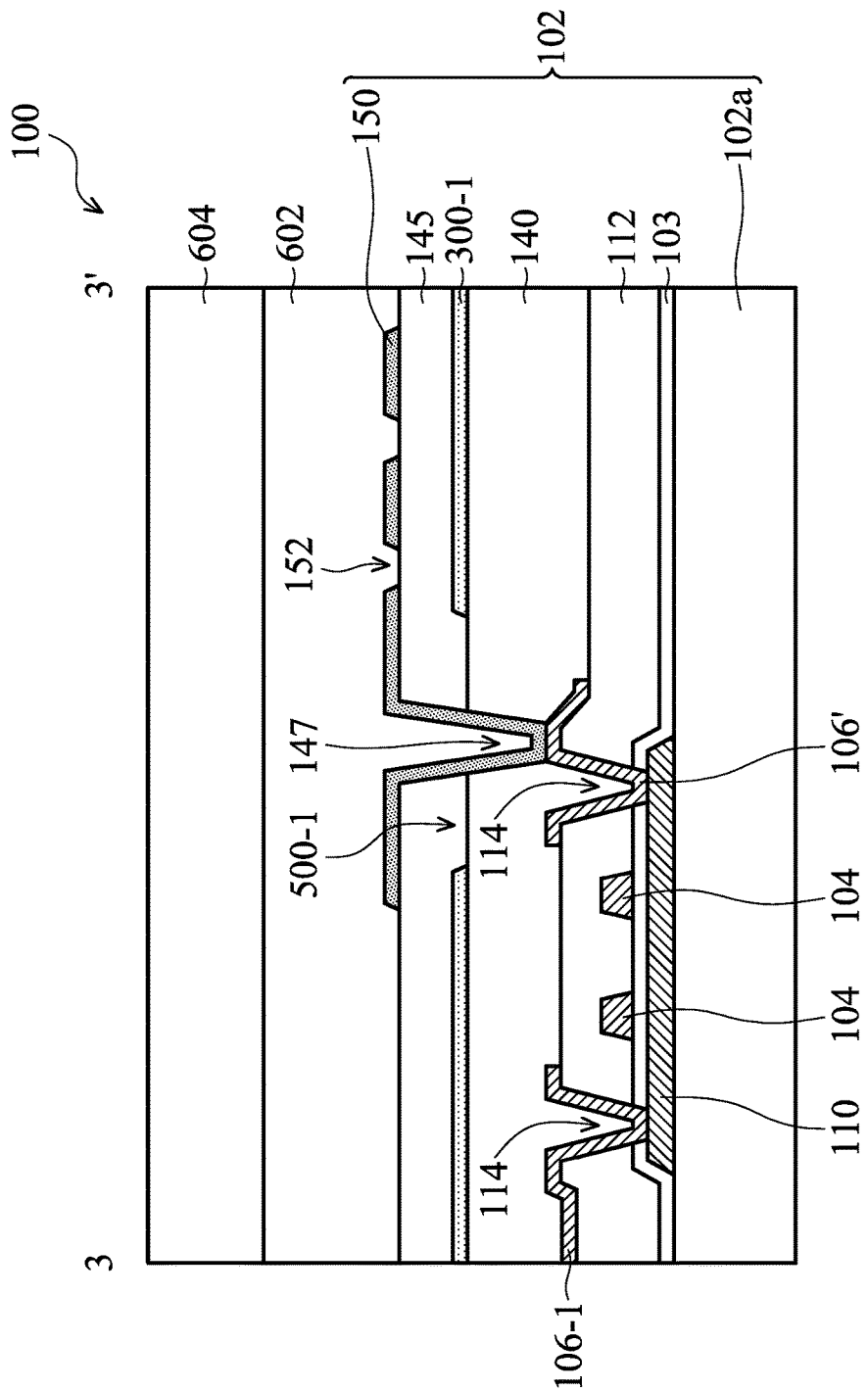
FIG. 3 is a schematic diagram showing a cross-sectional view along the line 3-3' in FIG. 2.

FIG. 1 shows a schematic top view showing an array substrate 102 of a display device 100 according to an embodiment of the present disclosure. FIG. 2 shows an enlargement diagram of FIG. 1. FIG. 3 shows a schematic cross-sectional view along line 3-3' in FIG. 2. In addition, the display device could be an organic light emitting diode display (OLED display), a liquid-crystal display (LCD) or an inorganic light emitting diode display with micrometer size (micro LED display).

In FIG. 1, the array substrate 102 comprises a plurality of parallel scanning lines (gate lines) 104 extending along a first direction A1 and a plurality of parallel data lines (source lines) 106 extending along a second direction A2. The scanning lines 104 and the data lines 106 are disposed on a substrate 102a (see FIG. 3). Herein, the scanning lines 104 interlace the data lines 106. The first direction A1 and the second direction A2 are substantially perpendicular or orthogonal with each other. In other words, the first direction A1 can be the X-axis and the second direction A2 can be the Y-axis, but the first direction A1 and the second direction A2 can be not perpendicular or orthogonal with each other, having an inclined angle that is not 90 degrees.

In addition, the plurality of the scanning lines 104 and the plurality of the data lines 106 define a plurality of sub-pixels 108. Herein, the plurality of sub-pixels 108 are arranged in a three-by-three (3×3) array as illustrated on the array substrate 102 shown in FIG. 1, illustrating four scanning lines comprising a first scanning line 104-1, a second scanning line 104-2, a third scanning line 104-3, and a fourth scanning line 104-4, and four data lines comprising a first data line 106-1, a second data line 106-2, a third data line 106-3, and a fourth data line 106-4.

The array substrate 102 further comprises a plurality of thin-film transistors (TFTs, not shown in FIG. 1, see FIGS. 3-4) disposed corresponding to the sub-pixels 108. Two terminals of the TFTs are electrically connected with the scanning line 104 and the data line 106. Herein, the plurality of sub-pixels 108 (e.g. the three sub-pixels 108 illustrated herein) disposed along the first direction A1 form a pixel 600.

The data lines 106 provide source signals to the sub-pixels 108 via the TFTs (not shown in FIG. 1, see FIGS. 3-4), and the scanning lines 104 provide scanning pulse-signals to the sub-pixels 108 via the TFTs (not shown in FIG. 1, see FIGS. 3-4) to control the sub-pixels 108 together with the above source signals.

In FIGS. 1 and 3, the array substrate 102 further comprises a planarization layer 140 disposed on the substrate 102a for overlapping the scanning lines 104 and the data lines 106, and a common electrode 300 disposed on the planarization layer 140. A planarization layer 140 is defined as the first insulating layer. Herein, the common electrode 300 comprises a plurality of sub-common electrode rows 300R extending along the first direction A1. The sub-common electrode rows 300R are sequentially arranged along the second direction A2. For example, three sub-common electrode rows 300R extending along the first direction A1 are illustrated in FIG. 1, comprising a first sub-common electrode row 300-1, a second sub-common electrode row 300-2, and a third sub-common electrode row 300-3 sequentially arranged along the second direction A2. The first, second, and third sub-common electrodes 300-1, 300-2, and 300-3 are disposed adjacent to each other. In some embodiments, the sub-common electrode row corresponds to one row of the plurality of sub-pixels.

The sub-common electrode rows 300R respectively comprises a first portion 300A1 and a second portion 300A2 separated, and a connection portion 300A3 disposed between the first portion 300A1 and the second portion 300A2 for connecting the first portion 300A1 and the second portion 300A2. The first portion 300A1 and the second portion 300A2 may extend along the first direction A1.

As shown in FIG. 1, the second portion 300A1 of one of the sub-common electrode rows 300R is connected to the first portion 300A1 of the sub-common electrode row 300 adjacent thereto. For example, the second portion 300A2 of the first sub-common electrode row 300-1 is connected to the first portion 300A1 of the second sub-common electrode row 300-2. As shown in FIG. 1, the first sub-common electrode row 300-1 comprises two connection portions 300A3, and the second and third sub-common electrode rows 300-2 and 300-3 respectively comprises a connection portion 300A3. However, FIG. 1 only shows a portion of the entire sub-pixel, namely, only shows a plurality of sub-pixels 108 arranged in a three-by-three (3×3) array. Thus, in the entire sub-pixel of the display device, a sub-common electrode row may have a plurality of connection portions to connect the first portion and the second portion. As shown in FIG. 1, the first data line 106-1 overlaps the first sub-common electrode row 300-1, the second sub-common electrode row 300-2, and the third sub-common electrode row 300-3. The first data line 106-1 overlaps the first portion 300A1, the second portion 300A2, and the connection portion 300A3 of the first sub-common electrode row 300-1. An overlap area from a top view between the first data line 106-1 and the second and third sub-common electrode row 300-2, 300-3 are different from the overlap area from a top view between the first data line 106-1 and the first sub-common electrode row 300-1. A top view which is viewing from a direction perpendicular to the substrate. In the second sub-common electrode row 300-2, the first data line 106-1 overlaps the first portion 300A1 and the second portion 300A2, but does not overlap the connection portion 300A3. Similarly, in the third sub-common electrode row 300-3, the first data line 106-1 overlaps the first portion 300A1 and the second portion 300A2, but does not overlap the connection portion 300A3.

Therefore, taking the three-by-three (3×3) sub-pixel array shown in FIG. 1 as an example, the number of first portions overlapping the first data line 106-1 is three, and the number of connection portions overlapping the first data line 106-1 is one. Namely, the number of first portions overlapping the first data line 106-1 is greater than the number of connection portions overlapping the first data line 106-1.

According to some embodiments, the sub-common electrode rows 300R comprise an opening extending along the first direction A1 for separating the first portion 300A1 and the second portion 300A2 of the sub-common electrode rows 300R where it is located. For example, as shown in FIG. 1, the first portion 300A1 and the second portion 300A2 in the first sub-common electrode row 300-1 are separated by a first opening 500-1, and connection portions 300A3 are respectively disposed on a first side and a second side of the first opening 500-1. The first side is opposite to the second side. From a top view which is viewing from a direction perpendicular to the substrate, the first opening 500-1 has a rectangular shape, and the first opening 500-1 exposes a portion of the underlying planarization layer 140. The first opening 500-1 extends along the first direction and crosses three sub-pixels 108 disposed between the first data line 106-1 and the fourth data line 106-4, and partially overlaps the second data line 106-2 and the third data line 106-3.

In addition, in the second sub-common electrode row 300-2, the first portion 300A1 and the second portion 300-A2 are separated by two second openings 500-2 disposed between the first portion 300A1 and the second portion 300A2, and the connection portion 300A3 is located between the second openings 500-2. The second openings 500-2 also expose a portion of the planarization layer 140. From a top view, the second openings 500-2 also have a rectangular shape. Similarly, in the third sub-common electrode row 300-3, the first portion 300A1 and the second portion 300-A2 are separated by two third openings 500-3 disposed between the first portion 300A1 and the second portion 300A2, and the connection portion 300A3 is located between the two third openings 500-3. The third openings 500-3 also expose a portion of the planarization layer 140. From a top view, the third openings 500-3 also have a rectangular shape. FIG. 1 only illustrates sub-pixels having a three-by-three (3×3) array, thus the second openings 500-2 illustrated in the second sub-common electrode row 300-2 are partially illustrated, and the third openings 500-3 illustrated in the third sub-common electrode row 300-3 are partially illustrated. Similar with the first opening 500-1, in the sub-pixel of the display device, the second opening 500-2 may also cross three sub-pixels 108, and the third opening 500-3 may also cross three sub-pixels 108.

In some embodiments of the present disclosure, the openings in various sub-common electrode rows may be misaligned in respect to the second direction A2. Namely, the openings in at least two sub-common electrode rows are misaligned in respect to the second direction A2. For example, taking the openings 500-1 and 500-2 in the first and second sub-common electrode rows 300-1 and 300-2 as an example, the first opening 500-1 is misaligned with the second opening 500-2 in respect to the second direction (e.g. the second data line 106-2). Namely, the first opening 500-1 and the second opening 500-2 are misaligned in respect to the second direction A2.

For example, the first opening 500-1 may be disposed between the first data line and the $(1+p)^{th}$ data line, the second opening 500-2 may be disposed between the $(1+q)^{th}$ data line and the $(1+p+q)^{th}$ data line, and the third opening 500-3 may be disposed between the $(1+2q)^{th}$ data line and the $(1+2q+p)^{th}$ data line, wherein n, p, and q are positive integers. More specifically, the first opening 500-1 may be disposed between the first data line 106-1 and the fourth data line 106-4 (p=3, q=1), crossing the second data line 106-2 and the third data line 106-3. The second opening 500-2 may be disposed between the second data line 106-2 and the fifth data line 106-5 (not shown), crossing the third data line 106-3 and the fourth data line 106-4. The third opening 500-3 is disposed between the third data line 106-3 and the sixth data line (not shown). The first, second and third openings respectively cross three sub-pixels. The symbol "p" represents the number of sub-pixels that the opening may cross. The symbol "q" represents the number of misaligned data lines between two openings. For example, as the first opening 500-1 crosses the second data line 106-2 and the third data line 106-3, the second opening 500-2 crosses the third data line 106-3 and the fourth data line 106-4, and the number of misaligned data lines between the first and second openings is 1. The above situation wherein p=3 and q=1 is used only as an example, and the number of "p" symbols can be changed to adjust the number of sub-pixels crossed by the opening, and also to adjust the number of misaligned data lines between two openings.

Through the misaligned configuration of the openings in various sub-common electrode rows, an overlapping area between each of the data lines and the common electrode can be substantially reduced to the same level, such that loading on the data lines can be more even. As shown in FIG. 1, the first data line 106-1 partially overlaps the second opening 500-2 in the second sub-common electrode row 300-2, but does not overlap the first opening 500-1 in the first sub-common electrode row 300-1. The second data line 106-6 partially overlaps the first opening 500-1 in the first sub-common electrode row 300-1, but does not overlap the second opening 500-2 in the second sub-common electrode row 300-2. The first data line 106-1 and the second data line 106-2 can be disposed adjacent to each other.

As shown in FIG. 1, the respective data lines 106 partially overlap the first portion 300A1 and the second portion 300A2 of the sub-common electrode 300A along the second direction A2, but they partially overlap one connection portion 300A3 of one of the sub-common electrode rows 300A. For example, the first data line 106-1 partially overlaps the first portion 300A1 and the second portion 300A2 of the first sub-common electrode row 300-1, the second sub-common electrode row 300-2, and the third sub-common electrode row 300-3, but partially overlaps the connection portion 300A3 of the first sub-common electrode 300-1. Also for example, the second data line 106-2 partially overlaps the first portion 300A1 and the second portion 300A2 of the first sub-common electrode row 300-1, the second sub-common electrode row 300-2, and the third sub-common electrode row 300-3, but partially overlaps the connection portion 300A3 of the second sub-common electrode row 300-2. The other data lines may have a similar configuration and are not described here for simplicity.

In addition, various data lines and the common electrode may have the same or a similar overlapping configuration along the second direction A2. In one embodiment, taking a predetermined number of sub-common electrode rows as the baseline (for example, taking the three sub-common electrode rows shown in FIG. 1 as the baseline), an overlapping region between the first data line 106-1 and the sub-common electrode row 300R is substantially equal to an overlapping region between the second data line 106-2 and the sub-common electrode row 300R. In other words, taking a predetermined number of sub-common electrode rows as the baseline, a total area between the openings in the common electrode and the first data line 106-1 substantially equals to a total area between the openings in the common electrode and the second data line 106-2. For example, the total area between the first, second, and third openings 500-1, 500-2, and 500-3, and the first data line 106-1 is substantially the same with a total area between the first, second, and third openings 500-1, 500-2, and 500-3, and the second data line 106-2.

According to an embodiment, the common electrode may comprise "N" sub-common electrode rows, and each of the sub-common electrode rows comprises at least one opening to form "N" openings, wherein "N" is an integer. The openings extend along the first direction. A total overlapping region between these "N" openings and the first data line is substantially the same as the total overlapping region between these N openings and the second data line.

Generally, since the common electrode 300 overlaps the scanning lines 104 and the data lines 106, parasitic capacitors are formed. In some embodiments of the present disclosure, as shown in FIG. 1, the overlapping region between the data lines and the common electrode may be reduced. More specifically, the number of first portions 300A1 of the common electrode overlapping the first data line 106-1 is greater than the number of connection portions 300A3 of the common electrode overlapping the first data line 106-1. This helps to reduce the parasitic capacitance between the common electrode and the data lines 106. In some embodiments, by forming an opening in the common electrode 300 along the second direction A2, the data lines 106 respectively overlap the opening (500-1 and/or 500-2 and/or 500-3), and the overlaps between the data lines 106 and the opening contributes to reducing the parasitic capacitance between the common electrode 300 and the data lines 106, thereby reducing the resistance-capacitance (RC) time delay that can happen to each of the data lines 106. In addition, the overlapping area between various data lines 106 and the sub-common electrode rows 300R are the same or similar, allowing various data lines to have the same or similar levels of electrical performance, thereby improving the image performance of the related sub-pixels 108 controlled by the data lines 106.

In addition, it should be noted that to clearly describe the present disclosure, other components such as the dielectric layer, the pixel electrode, the liquid-crystal layer and the second substrate that are sequentially formed are not illustrated here. In other embodiments, the display device could be an organic light emitting diode display (OLED display) or an inorganic light emitting diode display with micrometer size (micro LED display), but is not limited thereto.

Figure 4:
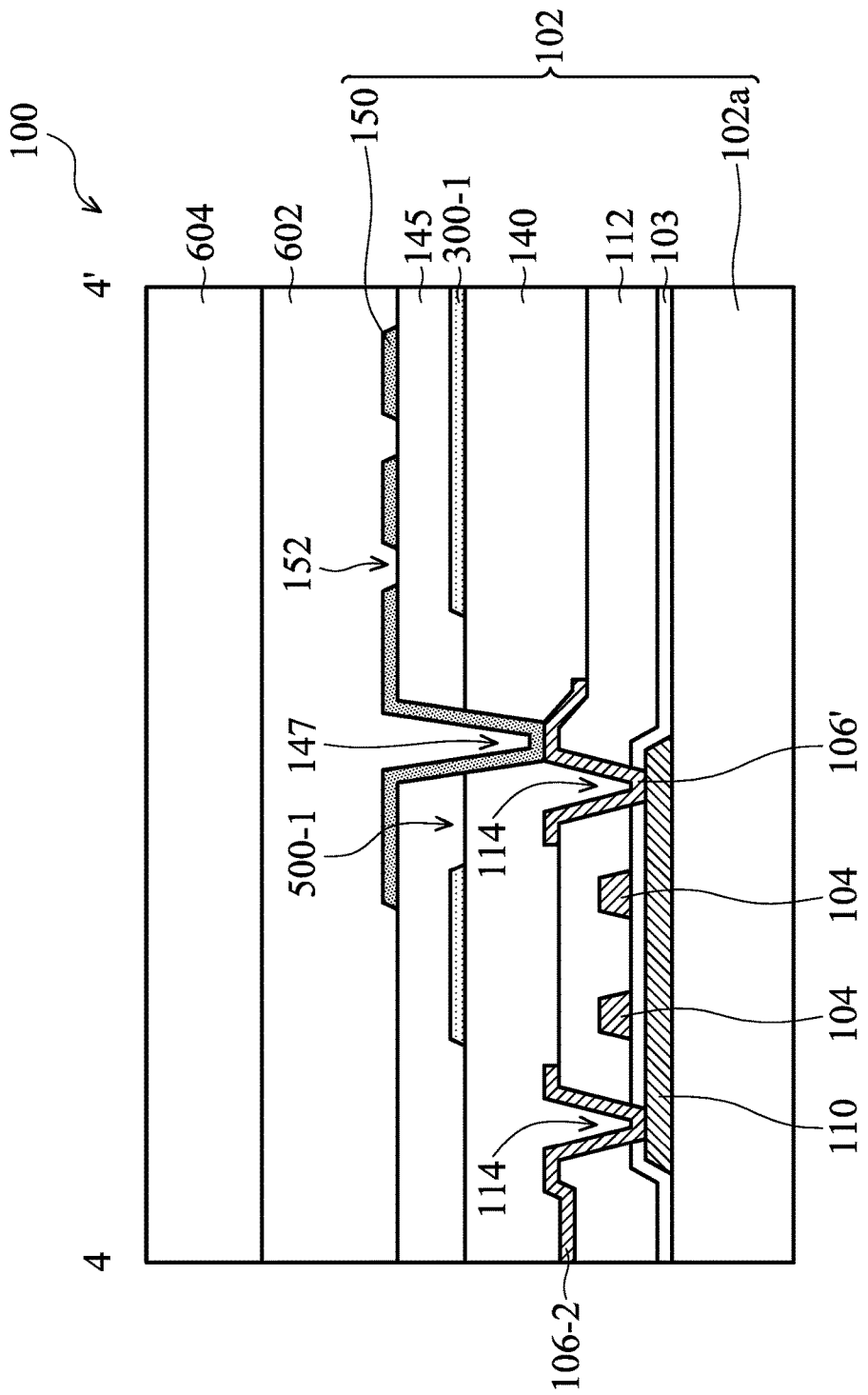
FIG. 4 is a schematic diagram showing a cross-sectional view along the line 4-4' in FIG. 2.

See FIG. 2, a schematic top view of a plurality of sub-pixels 108 (e.g. three sub-pixels 108) in a pixel 600 (e.g. the upmost pixel 600 along the second direction A2) is illustrated. FIG. 3 illustrates a schematic cross-sectional view along line 3-3' in FIG. 2, and FIG. 4 illustrates a schematic cross-sectional view along line 4-4' in FIG. 2.

FIG. 3 illustrates a cross-sectional structure of the first pixel 108-1 of the pixel 600 in FIG. 2. See FIGS. 1-3, the pixel 600 mainly comprises a substrate 102a, and a plurality of U-shaped semiconductor layer 110 separately disposed a portion of the substrate 102a. The shape of the semiconductor layer 110 is not limited to having a U shape, and can have another shape. An insulating layer 103 is disposed on the substrate 102a and the U-shaped semiconductor layer 110. A plurality of scanning lines 104 extending along the first direction A1 are separately disposed on a portion of the insulating layer 103 and respectively cover a portion of the semiconductor layer 110. An insulating layer 112 is disposed on the substrate 102a, the semiconductor layers 110, and the scanning lines 104. A plurality of data lines 106 extending along the second direction are separately disposed on the insulating layer 112 and partially cover a portion of one of the semiconductor layers 110. A plurality of conductive layers 106' are respectively disposed on a portion of the insulating layer 112 between two adjacent data lines 106 to partially cover another portion of one of the semiconductor layer 110. A plurality of contact holes 114 are separately disposed in the insulating layer 112 to respectively expose a top surface of several portions of the semiconductor layer 110. Herein, the data line 106 and a portion of the conductive line 106' respectively fills in one of the first contact holes 114 to form electrical connections to the semiconductor layer 102. A planarization layer 140 is blanketly formed on the substrate 102a, the data lines 106 and the conductive layer 106', and the insulating layer 112. A common electrode 300 made of transparent conductive materials is formed on the planarization layer 140. The common electrode 300 comprises a plurality of sub-common electrode rows 300R. The sub-common electrodes 300R comprise the openings 500. A dielectric layer 145 is defined as the second insulating layer. A dielectric layer 145 is disposed on the planarization layer 140 and the common electrode 300, and fills in the opening 500. A plurality of second contact holes 147 are separately disposed in a portion of the dielectric layer 145 and the planarization layer 140 to respectively expose a top surface of a portion of the conductive layer 106' and partially overlaps one of the first contact holes 114 thereunder. A plurality of comb-like-shaped transparent electrodes 150 having a plurality of slits 152 therein are respectively disposed on the dielectric layer 145 in each of the sub-pixels 108, and a portion of the transparent electrode 150 fills in one of the second contact holes 147 to contact the conductive layer 106'. A pixel structure is formed in the sub-pixel area 108.

As shown in FIG. 2, the portion of the transparent electrode 150 formed in the second contact holes 147 is used to electrically connect a drain of a thin-film transistor device (composed of portions of the scanning line 104, the insulating layer 103 and the semiconductor layer 110) and functions as a pixel electrode, and the second contact hole 147 partially overlaps one of the first contact holes 114, thereby exposing a portion of the conductive layer 106'. The transparent electrode 120 formed in the second contact hole 147 partially overlaps and contacts the conductive layer 106', thereby forming electrical connections.

As shown in FIG. 3, in some embodiments, the transparent electrodes 150 connected to the conductive layer 106' can be a patterned electrode comprising a plurality of slits 152. Moreover, the display device 100 comprises an array substrate 102, an opposing substrate 604, and a liquid-crystal layer 602 disposed between the opposing substrate 604 and the array substrate 102. Herein, formation of the slits 152 of the transparent electrode 150 (functioning as pixel electrodes) and the common electrode allows the display device 100 to function as a fringe-field-switching (FFS) type liquid-crystal display (LCD) panel.

As shown in FIG. 3, since the first sub-common electrode row 300-1 overlaps the underlying first data line 106-1, components such as the sub-common electrode row 300-1, the first data line 106-1 and the planarization layer 140 in the sub-pixel 108 still form a parasitic capacitor that has a parasitic capacitance.

Moreover, FIG. 4 illustrates a schematic cross-sectional view of the second sub-pixel 108-2 of the pixel 600 shown in FIG. 2, which is a cross-sectional view along line 4-4' in FIG. 2. Unlike the cross sectional view shown in FIG. 3, in the second sub-pixel 108-2, the sub-common electrode row 300-1 on the second data line 106-2 is partially removed to form the opening 500-1. That is, the second data line 106-2 partially overlaps the opening 500-1. Thus, a portion of the first sub-common electrode row 300-1 does not overlap the second data line 106-2 in the second sub-pixel 108-2. Corresponding to the first sub-pixel 108-1 shown in FIG. 3, the first common electrode row 300-1 overlaps the first data line 106-1. Thus, in the second sub-pixel 108-2, the parasitic capacitance between the common electrode and the data line 106-2 can be reduced.

In some embodiments, the TFTs in the display device 100 disclosed above are illustrated with a top-gate structure, as shown in FIGS. 3-4, and the scanning line (gate line) 104 is located on the semiconductor layer 110. In other embodiments, the TFTs in the display device 100 can be formed with a bottom-gate structure, and the scanning line (gate) 104 is located under the semiconductor layer 110.

The above embodiments are provided with an example having a plurality of sub-pixels arranged in a three by three array, and the openings in the sub-common electrode rows may cross three sub-pixels, but the disclosure is not limited thereto. According to need, a plurality of sub-pixels arranged in an m by m array can be designed (wherein m is a positive integer), and the openings in the sub-common electrode row may cross m sub-pixels.

Figure 5:
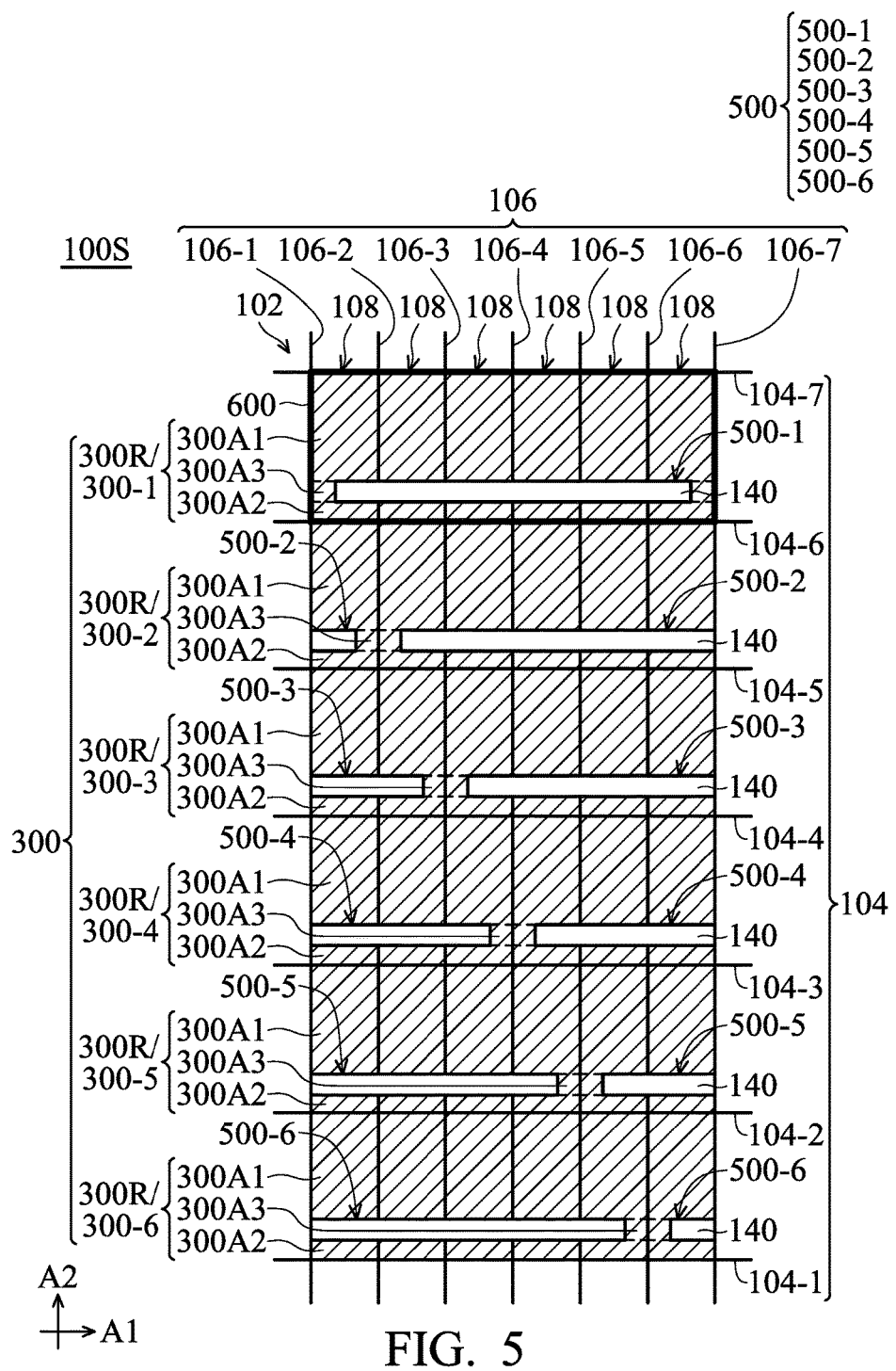
FIG. 5 is schematic top view showing a display device according to another embodiment of the disclosure.

For example, FIG. 5 illustrates another exemplary display device 100S. The structure shown in FIG. 5 is substantially the same with that shown in FIG. 1, but FIG. 5 is provided with a plurality of sub-pixels arranged in a six by six (m×m, m=6) array. The common electrode 300 comprises six sub-common electrode rows 300R, respectively extending along the first direction A1. Each of the sub-common electrode rows 300R comprises a first portion 300A1 and a second portion 300A2, and a connection portion 300A3 connecting the first portion 300A1 and the second portion 300A2. The opening 500 in the sub-common electrode row 300R crosses six (m) sub-pixels. The number of first portions 300A1 overlapping the first data line 106-1 is six, and the number of connection portions 300A3 overlapping the first data line 106-1 is one. That is, the number of first portions 300A1 overlapping the first data line 106-1 is greater than the number of connection portions 300A3 overlapping the first data line 106-1.

Similar with that illustrated in FIG. 1, the opening formed in various sub-common electrode rows may be misaligned along the second direction. That is, the openings in at least two of the sub-common electrode rows are misaligned along the second direction A2. For example, the first opening 500-1 in the first sub-common electrode row 300-1 is disposed between the first data line and the $(1+p)^{th}$ data line, the second opening 500-2 is disposed between the $(1+q)^{th}$ data line and the 1+p+qth data lone, and the $3^{rd}$ opening 500-3 is disposed between the 1+2qth data line and the $(1+2q+p)^{th}$ data line, . . . and the sixth opening 500-6 is disposed between the $(1+5q)^{th}$ data line and the $(1+5q+p)^{th}$ data line, wherein n, p, and q are positive integers. More specifically, the first opening 500-1 is disposed between the first data line 106-1 and the $7^{th}$ data line 106-7 (p=6, q=1). The second opening 500-2 is disposed between the second data line 106-2 and the $8^{th}$ data line (not shown), etc., and the sixth opening 500-6 may be disposed between the second data line 106-2 and the eighth data line (not shown). The first, second, . . . , sixth openings respectively cross six sub-pixels. The symbol "p" represents the number of sub-pixels that the opening crosses. The symbol "q" represents the number of data lines misaligned between the two openings. For example, the first opening 500-1 crosses the second data line 106-2 to the sixth data line 106-6, and the second opening 500-2 crosses the third data line 106-3 to the seventh data line 106-7. This represents that the number of data lines misaligned between the first and second openings is one. The above situation that p=6 and q=1 is only as an example. In other embodiments, the number of "q" symbols can be changed to adjust the number of sub-pixels to be crossed, and the number of "q" symbols can be changed to adjust the number of misaligned data lines between two openings.

As described above, in some embodiments, the common electrode is partially removed to form openings in the sub-common electrode rows to reduce overlaps between the common electrode and the data lines and reduce the parasitic capacitance issue derived by overlaps between the common electrode and the data lines, thereby reducing the resistance-capacitance (RC) time delay in the display device. In addition, in some embodiments of the present disclosure, various data lines and the common electrode are provided with the same or similar overlapping configurations, such that allowing the same or similar electrical properties of the various data line, and improving the image performance controlled by the various data lines.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A display device, comprising
an array substrate, comprising:
   a substrate;
   a first data line disposed on the substrate and extending along a first direction;
   a first insulating layer disposed on the first data line; and
   a common electrode disposed on the first insulating layer, wherein the common electrode comprises:
   a plurality of sub-common electrode rows, wherein the sub-common electrode rows extend along the second direction which is different from the first direction;
   wherein the sub-common electrode rows respectively comprise:
      a first portion extending along the second direction;
      a second portion extending along the second direction, the second portion being apart from the first portion; and at least one connection portion connecting the first portion and the second portion;
   wherein the first data line overlaps the sub-common electrode rows, and the number of first portions overlapping the first data line is greater than the number of connection portions overlapping the first data line.

2. The display device as claimed in claim 1, wherein the sub-common electrode rows respectively comprises at least one opening, and the opening extends along the second direction, and separate the first portion and the second portion, and the opening exposes a portion of the first insulation layer.

3. The display device as claimed in claim 2, wherein the first data line overlaps the at least one opening in one of the sub-common electrode rows.

4. The display device as claimed in claim 2, further comprising a second data line adjacent to the first data line and extending along the first direction, wherein the at least one opening in one of the sub-common electrode rows overlaps the first data line and the second data line.

5. The display device as claimed in claim 2, further comprising a second data line adjacent to the first data line and extending along the first direction, wherein the sub-common electrode rows comprise a first sub-common electrode row and a second sub-common electrode row which is adjacent to the first sub-common electrode row, and the first sub-common electrode row comprises a first opening extending along the second direction, and the second sub-common electrode row comprises a second opening extending along the second direction, wherein the first data line partially overlaps the second opening but does not overlap the first opening, wherein the second data line partially overlaps the first opening but does not overlap the second opening.

6. The display device as claimed in claim 2, further comprising a second data line adjacent to the first data line and extending along the first direction, wherein the common electrode comprises N sub-common electrode rows, and each of the sub-common electrode rows comprises at least one opening, forming at least N openings, N is a positive integer, wherein an overlapping area between the N openings and the first data line and an overlapping area between the N openings and the second data line are substantially the same.

7. The display device as claimed in claim 1, wherein the array substrate further comprises:
- a thin-film transistor disposed on the substrate and electrically connected with the first data line;
- a second insulating layer disposed on the common electrode; and
- a pixel electrode disposed on the second insulating layer, and the pixel electrode being electrically connected with the thin-film transistor.

8. The display device as claimed in claim 1, further comprising:
- an opposing substrate disposed oppositely to the array substrate; and
- a display layer disposed between the array substrate and the opposing substrate.

9. A display panel, comprising
an array substrate, comprising:
- a substrate;
- a first data line disposed on the substrate and extending along a first direction;
- a first insulating layer disposed on the first data line; and
- a common electrode disposed on the first insulating layer, wherein the common electrode comprises:
  - a plurality of sub-common electrode rows, wherein the sub-common electrode rows extend along the second direction which is different from the first direction;
  - wherein the sub-common electrode rows respectively comprise:
    - a first portion extending along the second direction;
    - a second portion extending along the second direction, the second portion being apart from the first portion; and at least one connection portion connecting the first portion and the second portion;
  - wherein the first data line overlaps the sub-common electrode rows, and the number of first portions overlapping the first data line is greater than the number of connection portions overlapping the first data line.

10. The display panel as claimed in claim 9, wherein the sub-common electrode rows respectively comprises at least one opening, and the opening extends along the second direction, and separate the first portion and the second portion, and the opening exposes a portion of the first insulating layer.

11. The display panel as claimed in claim 10, wherein the first data line overlaps the at least one opening in one of the sub-common electrode rows.

12. The display panel as claimed in claim 10, further comprising a second data line adjacent to the first data line and extending along the first direction, wherein the at least one opening in one of the sub-common electrode rows overlaps the first data line and the second data line.

13. The display panel as claimed in claim 10, further comprising a second data line adjacent to the first data line and extending along the first direction, wherein the sub-common electrode rows comprise a first sub-common electrode row and a second sub-common electrode row which is adjacent to the first sub-common electrode row, and the first sub-common electrode row comprises a first opening extending along the second direction, and the second sub-common electrode row comprises a second opening extending along the second direction, wherein the first data line partially overlaps the second opening but does not overlap the first opening, wherein the second data line partially overlaps the first opening but does not overlap the second opening.

14. The display panel as claimed in claim 10, further comprising a second data line adjacent to the first data line and extending along the first direction, wherein the common electrode comprises N sub-common electrode rows, and each of the sub-common electrode rows comprises at least one opening, forming at least N openings, N is a positive integer, wherein an overlapping area between the N openings and the first data line and an overlapping area between the N openings and the second data line are substantially the same.

15. The display panel as claimed in claim 9, wherein the array substrate further comprises:
- a thin-film transistor disposed on the substrate and electrically connected with the first data line;
- a second insulating layer disposed on the common electrode; and
- a pixel electrode disposed on the second insulating layer, and the pixel electrode being electrically connected with the thin-film transistor.

16. The display panel as claimed in claim 9, further comprising:
- an opposing substrate disposed oppositely to the array substrate; and
- a display layer disposed between the array substrate and the opposing substrate.

* * * * *